Jan. 20, 1959 R. C. LOCKWOOD 2,870,381

MICRO-WAVE TRANSMISSION NETWORKS

Filed April 30, 1956 3 Sheets-Sheet 1

INVENTOR
ROBERT C. LOCKWOOD
BY Frank E. Ward
ATTORNEY

MICRO-WAVE TRANSMISSION NETWORKS

INVENTOR
ROBERT C. LOCKWOOD
BY Frank E. Ward
ATTORNEY

MICRO-WAVE TRANSMISSION NETWORKS

Filed April 30, 1956 3 Sheets-Sheet 3

INVENTOR
ROBERT C. LOCKWOOD
BY Frank E. Ward
ATTORNEY

United States Patent Office 2,870,381

Patented Jan. 20, 1959

2,870,381

MICRO-WAVE TRANSMISSION NETWORKS

Robert C. Lockwood, Hempstead, N. Y., assignor to Instruments for Industry, Incorporated, Mineola, N. Y., a corporation of New York Application April 30, 1956, Serial No. 581,476

10 Claims. (Cl. 317—99)

This invention relates to micro-wave transmission networks and more particularly to a low inductive input line unit for use in broad bandwidth amplifying systems.

In broad bandwidth type amplifiers, the frequency response characteristics are controlled by grid loading effects, grid lead inductance and input line losses, so that the upper limits are materially attenuated, unless design provisions are made to offset these impedance limitations.

This invention may be designed for low-pass or band-pass type amplifiers where the response characteristic range may be extended from zero to 200 to 300 megacycles by the application of traveling wave concepts to micro-wave transmission in conventional tube arrays, to permit the removal of "bandwidth product" limitations in these circuits.

In conventional video amplifiers, the frequency limits are determined by factors which are proportional to the ratio of the transconductance $G_m$ of the tube to the square root of the product of the input and output capacitances. In the distributed amplifier, the tubes are paralleled in such a manner that the transconductances may be added and not affect the input and output impedances of the amplifier. Now, if a generator is coupled to the input, the currents flowing from each tube will add in the plate circuit. Thus, the output voltage will be directly proportional to the number of tubes in the amplifier and the effective gain can be increased by any desired amount.

However, the frequency range is dependent on the input circuit impedances where the filter sections must present a low inductance for a wide frequency range. When an attempt is made to apply the principles of the distributed amplifier to the micro-wave range above one hundred megacycles, the effect of lead inductance, grid loading and line loss, may materially limit the response characteristics and thereby render the operating efficiency low.

The primary object of this invention, is to increase the upper limits of bandwidth in the micro-wave range for distributed amplifier stages having a gain greater than unity.

A further object of the invention, is to substantially eliminate the effect of grid lead inductance and line losses, so that input circuit efficiency may be increased and the response characteristics broadened.

Another object of the invention, is to produce a grid line unit which is both mechanically and electrically stable and having the capability of maximum frequency amplification.

These objects are attained, in accordance with this invention, by the provision of an inductive unit having a mounting panel or plate with a plurality of contacts of suitable areas and a plurality of intermediate long conductive strips having minimum inductance. These contacts and strips are coupled together successively by pairs of U-shaped inductance elements which extend linearly along the supporting plate and are joined to alternate sections of the contacts and conductive strips. These elements are preferably paralleled in close linear relation and in juxtaposition with respect to the contacts and strips, so that the maximum effect of mutual inductance is realized with the minimum amount of loss. In one aspect of the invention, the strips may be attached to one side of the supporting plate or panel. It is also conceivable, that the contacts and strips might be applied to the plate by the printed wiring technique, to provide the large metallic surface areas required on the mounting plate. In either form, the U-shaped elements may be affixed to the opposite side of the plate and interconnected to the contacts and strips, to achieve the enhanced results of this invention.

A feature of the invention relates to the construction having a maximum amount of mutual inductance between filter section halves, to attain a desired negative inductance in series with the lead inductance of the tube electrodes.

Another feature of the invention relates to the direct coupling of the grid line unit to the grid terminals of the tubes in the distributed amplifier circuit, so that the lead inductance is held to a minimum.

These and other features and advantages of the invention may be more clearly understood by reference to the following detailed description when considered in connection with the accompanying drawings.

Figure 1:
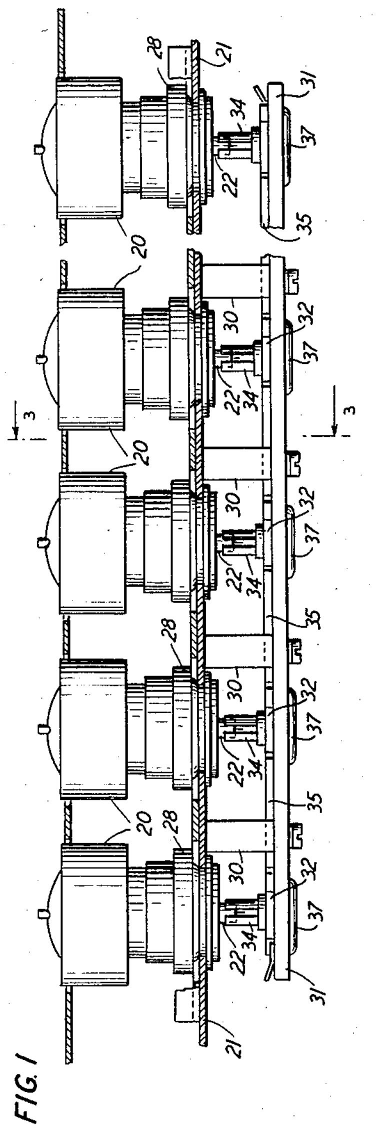
Fig. 1, is a side view, in elevation, of an amplifier grid line unit embodying the features of this invention.
Figure 2:
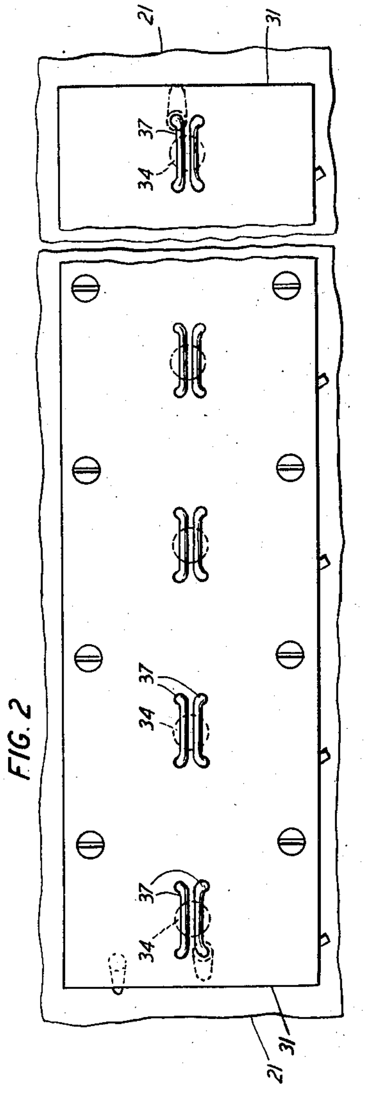
Fig. 2, shows a bottom plan view of Fig. 1, illustrating thet relation of the grid line unit as applied to the multiple tubes of the amplifier.
Figure 3:
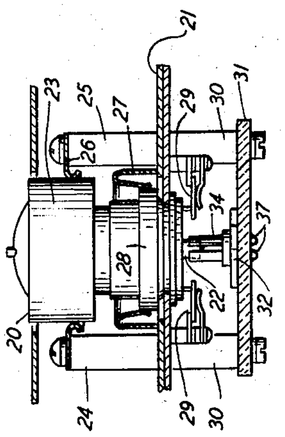
Fig. 3, is an end view, in elevation, taken on the line 3—3 of Fig. 1, showing the details of the assembly.
Figure 4:
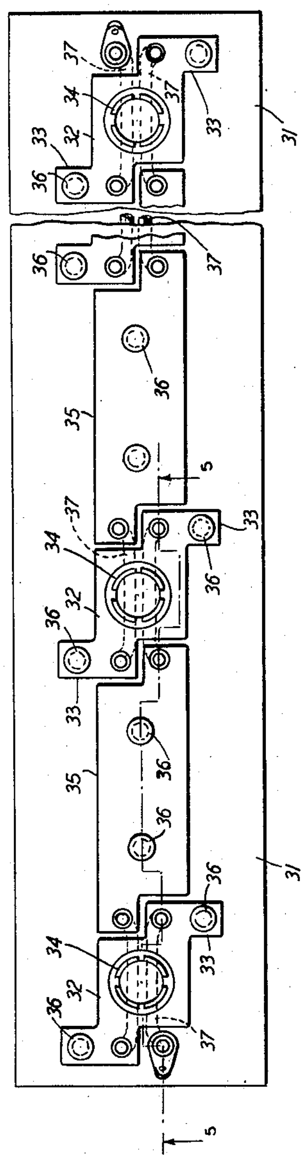
Fig. 4, is a plan view of the grid line unit, showing the coupling plates and inductive connections for the several tubes of the amplifier.
Figure 5:
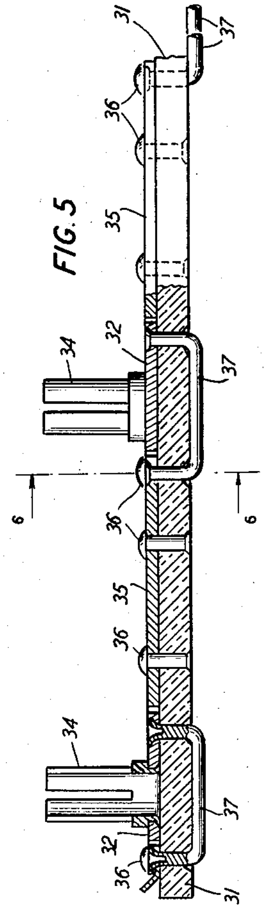
Fig. 5, shows in cross-section, taken on the line 5—5 of Fig. 4, the details of construction of the unit.
Figure 6:
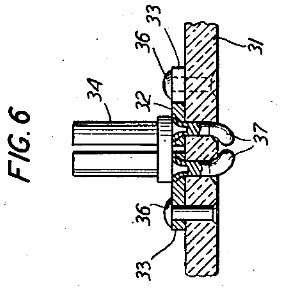
Fig. 6, is another cross-section view, taken on the line 6—6 of Fig. 5, showing the coupling of the inductive connections to the strips and contacts.

The concepts of this invention are suitably applied, in one aspect, to an ultra-high-frequency distributed amplifier stage, as shown in Fig. 1, involving six high power vacuum tubes 20, preferably of a type similar to the Eitel and McCullough 4X150A vacuum tube. This tube is a tetrode type having a screen grid connected to a coaxial peripheral ring or terminal at the lower end of the tube, an anode or output electrode connected to a central terminal at the top end of the tube and a central terminal for the grid or input electrode at the bottom end of the tube. The coaxial design of the terminals of the tube and the segregation of the input and output electrodes, provides an isolated arrangement of the input and output circuits, so that high efficiency may be attained at ultra high frequencies and high power output achieved in a minimum of space allotment. As shown in Fig. 1, only five tubes are shown in series relation, to conserve space, with the tubes 20, mounted on a supporting base or panel 21, having a plurality of socket openings to receive the smaller end of the tubes. In this relation, the grid terminal 22, of each tube is below the base, while the larger end of the tube projects above the base. Because of the high power consumption of the amplifier, approximately one (1) kilowatt, adequate cooling of the tubes is necessary, particularly at the anode or output electrode. For this purpose, the anode of each tube is surrounded by a radially finned cylinder or radiator 23, shown more clearly in Fig. 3, and a blower, not shown, is provided, to produce a forced draft of air to the radiators, in order to dissipate the heat generated in the operation of the amplifier. Also shown in Fig. 3, is the circuit connections for supplying suitable potentials to the electrodes of the tubes. Insulating posts 24 and 25 extend from the base 21, to support spring pressure ring contacts 26, which frictionally engage and surround the radiator 23 of the tube, to supply the high voltage to the anode or output electrode of the tube. Another spring pressure ring contact 27, of different formation, is mounted on the base 21 and engages the screen grid terminal 28. This electrode is maintained at ground potential in the operation of the amplifier. Suitable auxiliary spring contacts 29, insulated from the base 21, engage the filament terminals of the tubes, for energizing the electron emitting element in the tube. A pair of short posts or spacers 30, extend from the opposite side of the base from the posts 24 and 25, and are distributed along the length of the panel in pairs between the several tubes. These spacers support a rectangular plate or sub-panel 31, which forms a mounting for the grid line unit that constitutes one embodiment of this invention, as applied to the distributed amplifier type of apparatus useful in the propagation of broad bandwidth micro-wave frequencies at a high power level.

The grid line unit is shown clearly in Figs. 4 to 7 inclusive, and comprises a plurality of similar symmetrical plates or contacts 32, preferably of silver-plated brass, approximately of 14 gauge material. These contacts are provided with offset extensions 33, which project from opposite directions transverse to the linear plane of the contacts along the length of the support 31. A slotted metal sleeve 34, of beryllium copper, or similar material, is swedged to the center of each contact and projects perpendicular to the support 31, so that each sleeve may be readily attached to the grid terminals of the tubes of the amplifier arrangement, as shown in Figs. 1 and 3. Intermediate the contacts 32 are a plurality of elongated metallic strips 35, of silver-plated brass, of one sixteenth inch thickness, with the ends undercut to match the extensions 33 of the contacts. These strips extend between and are spaced from, successive contacts 32 in linear relation and length, dependent on the space relation of the tubes in the amplifier. Both the strips and the contacts are secured to the supporting plate 31, by rivets 36, the strips being attached along a central longitudinal line, while the contacts are attached at the terminations of the extensions 33.

While the embodiment shown, pertains to separate contacts and strips of metallic surfaces of comparatively large surface area and mass, it is within the scope of this invention to form these surfaces by the "printed wiring technique" so that the large surfaces may be produced on the supporting plate 31.

Figure 7:
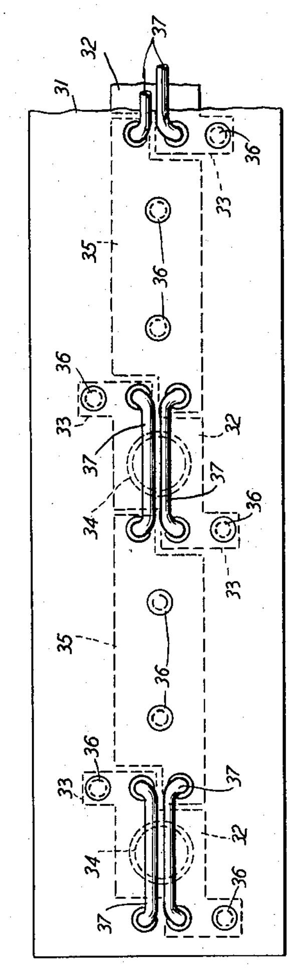
Fig. 7, is a plan view, of the opposite side of the unit, as shown in Fig. 4, and illustrating the close relationship of the inductance elements embodied in the unit.

As shown in Fig. 7, the contacts 32 and strips 35 are lined up longitudinally with a corner of each strip in spacial alignment with an extension 33, of a contact at opposite positions with respect to the sleeve member 34 on the contact 32. This affords an easy method of connecting these areas together electrically by short U-shaped coupling elements 37, which form the inductances for controlling the mutual inductance of the grid lead-in connections. Preferably, as shown in Fig. 7, these U-shaped rods or wires are formed of one sixteenth inch diameter wire and silver-plated, to reduce surface erosion. The rods are formed with legs counterbored near their ends and the legs offset from the longitudinal section between the legs. When so formed, the legs may be inserted in each tab of the strip 35 and extend across the width of the contact and enter a corresponding hole in the extension 33 of the contact and be attached thereto by spinning over the hollow rivet type end of the legs, on the facing side of the plate 31. As indicated, this arrangement provides the active inductance elements along the rear surface of the plate 31, which are paralleled with respect to each other over the greatest portion of their length and relatively close together magnetically, so that the maximum mutual inductance of the grid unit may be attained.

These elements 37 are arranged in parallel paired relation, so that the maximum mutual coupling is attained between them. This is accomplished by mounting the coupling elements over the greatest distance longitudinally between the large surface areas of the strips and contacts, due to the staggered relation of the extensions 33 of the contacts and the offset tabs of the strips 35. The coupling elements are extended over the length of the contacts 32, so that the U-shaped wires may form a maximum amount of the circuit inductance and that a maximum amount of mutual inductance may be contributed by the U-shaped wires being adjacent and parallel over as great a distance as possible. The spacing of the coupling wires is approximately .050 inch and the inductance between the wires is approximately .01 microhenries. The strips 35 and the contacts 32 have a minimum amount of inductance value in the circuit and serve primarily as large contact surfaces, for coupling the inductance elements to the grids of the tubes at low minimum lead-in loss.

Figure 8:
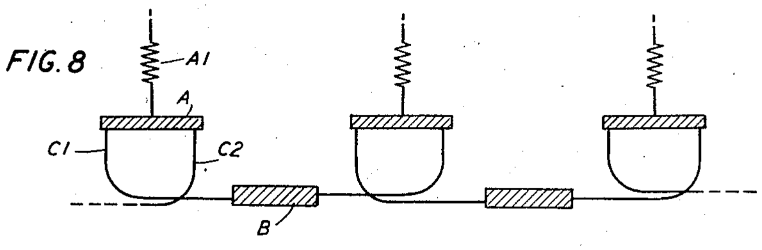
Fig. 8, represents a diagrammatic view of the grid line unit.

The electrical effect of the novel arrangement of the grid line unit may be realized from Fig. 8, which shows the plates A, corresponding to the contacts 32, and the plates B, corresponding to the strips 35, the plates A being coupled directly to the control grid $A_1$ of the tube. As indicated, the connections $C_1$ and $C_2$, correspond to the coupling inductance elements 37, which are joined to the plates A and B over parallel paths which substantially reduce mutual inductance to a minimum.

Figure 9:
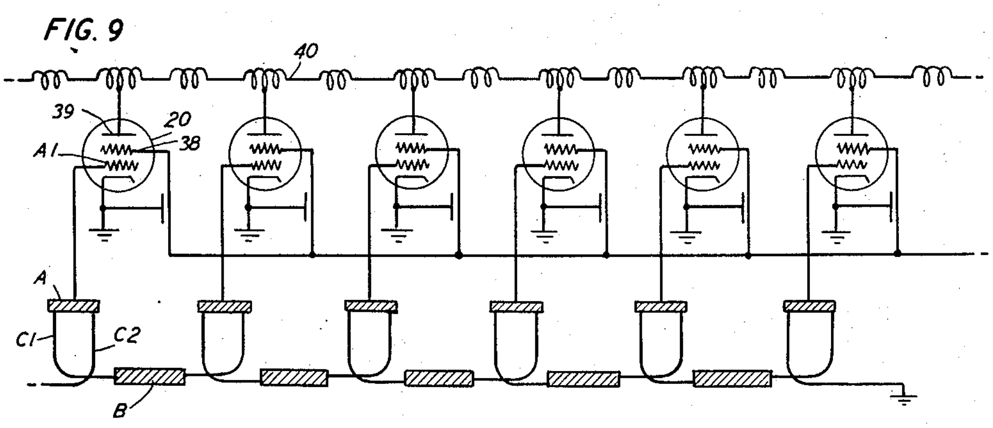
Fig. 9, shows a schematic view of the amplifier, with the grid line unit in relation to the grid terminals of the tubes.

The application of the grid line unit of this invention to the distributed amplifier array is shown schematically in Fig. 9, in which the grid line unit is shown coupled to the grids of the several tubes, the screen grids 38 are all connected to the common ground point in the system, and the anodes 39 are connected in parallel to the output inductances in the output line 40. A more detailed description of the distributed amplier type of system is contained in U. S. Patent No. 2,759,051, issued August 14, 1956, to Robert C. Lockwood et al., and assigned to the same assignee.

Figures 10, 11:
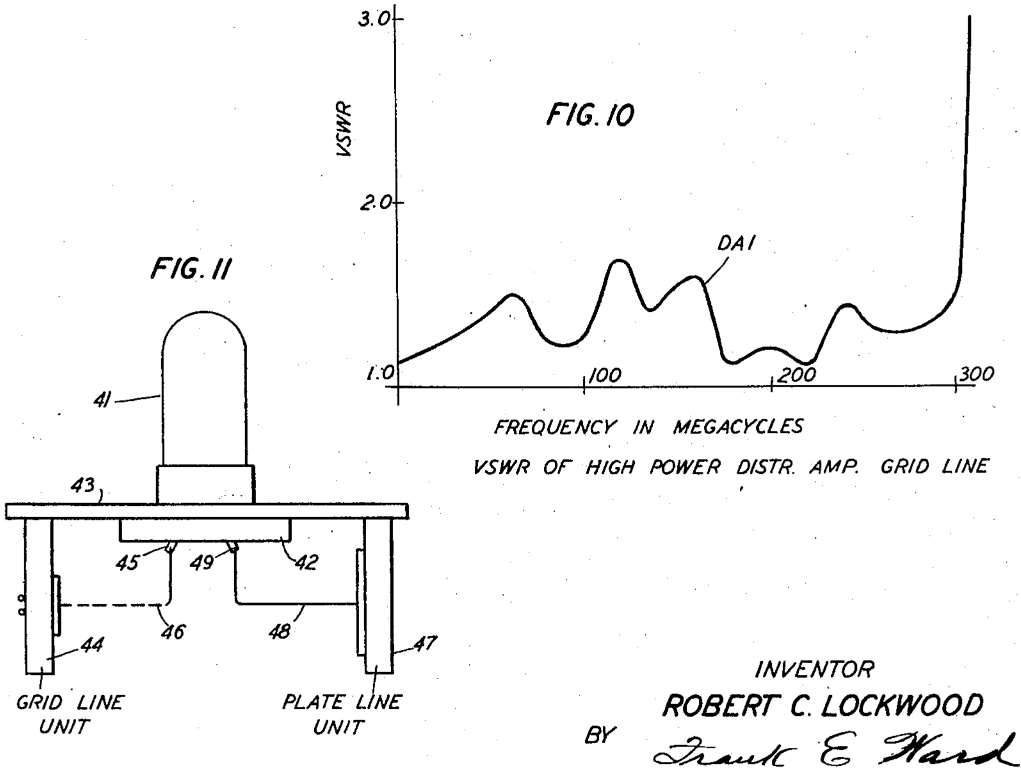
Fig. 10, shows the response curve achieved by this invention over the broad bandwidth of the micro-wave range.
Fig. 11, illustrates in an end elevation view, a modified form of the invention, to indicate the application of the invention to a different combination of tubes in a distributed amplifier assembly.

Fig. 10, represents an improved frequency response curve attained by the application of the mutual inductance unit of this invention to the frequency range of the distributed amplifier. In this graph, the abscissa refers to frequency in the megacycle range, while the coordinates represent percentage of voltage standing wave ratio. As indicated, the range of the amplifier has been increased from zero to about three hundred (300) megacycles, as shown by the curve $DA_1$. The improved increase in the frequency range is the result of materially reducing the grid lead inductance, grid loading and input circuit capacitance, so that less than a 1.7 to 1 VSWR occurs in the 300 megacycle span of the broad bandwidth amplifier range.

As heretofore described, the invention relates to an assembly in which the grids of the tubes in the amplifier could be directly connected to the grid line unit by clipping the stack or unit panel to the tubes where the grid is conveniently coupled to a terminal on one end of the tube which is segregated from the other terminals of the tube. The invention may also be applicable to other arrangements. For example, as shown in Fig. 11, which is a diagrammatic view, the tube 41, represents a conventional triode or pentode type tube, wherein the tube is mounted in a conventional socket 42, on a base plate 43. In such an arrangement, a grid line unit 44, as developed in accordance with the disclosures in Figs. 4 to 7 inclusive, would be coupled to the grids of the tubes, as represented by the socket terminal 45, by the connection 46, and the plate line unit, such as represented by the inductance string 40, in Fig. 9, would be coupled to the anodes of the tubes by connection 48, joined to the terminal 49, of the tube sockets.

While the invention has been disclosed in various aspects herein, it is, of course, understood, that the invention is not limited thereby, but that various modifications may be devised from the disclosure herein, without departing from the scope of the invention as defined in the appended claims.

I claim:

1. A micro-wave transmission network unit, comprising an insulating plate, a series of elongated metallic strips on the surface of said plate, segregated metallic contacts intermediate said strips, and pairs of parallel metallic connectors extending across said contacts and coupling remote ends of said strips and contacts together linearly, the connectors of each pair being closely paralleled to attain maximum mutually inductive coupling therebetween.

2. A micro-wave transmission network unit, comprising an insulating plate, a series of elongated metallic strips on the surface of said plate, segregated metallic contacts intermediate said strips, and pairs of parallel metallic connectors extending across said contacts on the opposite side of said plate and coupling remote ends of said strips and contacts together linearly, said connectors being closely and parallelly positioned to have maximum mutual inductance therebetween.

3. An input line inductive unit, comprising an insulating plate, a plurality of metallic contact members distributed along the length of said plate, symmetrical metallic strips intermediate said contacts, pairs of parallel conductive connectors interconnecting said strips and contact members, a different pair of connectors extending across each contact member, the connectors of each pair connecting the adjacent ends of the preceding and succeeding strips to the remote ends of the intermediate contact member, whereby the current in said parallel conductors is in the same direction and the current in the associated contact member is in the opposite direction, and spring coupling means extending from said contact members for direct attachment to the grid terminals of a series of vacuum tubes.

4. An input line inductive unit, comprising an insulating plate, a plurality of metallic contacts distributed along the length of said plate, symmetrical metallic strips intermediate said contacts, pairs of conductive connectors extending along the opposite side of said plate and having bent ends projecting therethrough in alternate linear relation to said strips and contacts, said connectors having elongated intermediate portions disposed across said contacts, and a resilient coupling sleeve extending from each contact for direct attachment to the grid terminals of a series of vacuum tubes, the connectors of each said pair being closely and parallelly positioned on the other side of the insulating plate opposite one of said metallic contacts whereby maximum mutual inductance is attained in the parallel connectors of each pair.

5. An input line inductive unit comprising an insulating plate, a plurality of metallic contacts linearly distributed along one side of said plate, elongated metal strips, each strip intermediate two of said contacts, a resilient sleeve extending from each metallic contact for direct engagement with an electrode terminal of one of a series of vacuum tubes, and pairs of conductive connectors interconnecting said contacts and strips alternately in series, the connectors of each pair extending across an associated contact in closely parallel position on the opposite side of said plate so that the currents through the parallel connectors of each pair are in the same direction and have maximum coupling therebetween and the current in the associated one of the contacts is in the opposing direction.

6. A grid line inductive unit, for broad bandwidth distributed amplifier systems, comprising a rectangular insulating plate, a plurality of metallic contacts spaced on one side of said plate, each contact having projections from opposite ends along said plate, a plurality of metallic connecting strips interposed between said elements, the ends of said strips conforming to the contour of said contacts without engagement therewith, the ends of adjacent strips and contacts having aligned portions transverse to the length of said plate, metal sleeve members each extending from one of said contacts for engagement with an electrode of one of a series of vacuum tubes, and pairs of U-shaped metal connectors, the connectors of each pair having intermediate portions extending in close parallel relation along the other side of said plate opposite an associated one of said contacts, the ends of each pair of connectors extending through said plate to connect the remote ends of the associated one of said contacts to the near ends of the linearly preceding and succeeding strips respectively, the current in the connectors of each pair being in the same direction to have maximum mutual inductance, the current in the associated one of said contacts being in the opposite direction and distributed therein to minimize the self-inductance therein attained.

7. A micro-wave transmission network comprising an insulating plate, a lead-in terminal fixed to said plate for connection to the corresponding electrode of a plurality of vacuum tubes, metallic contact elements fixed on one side of said plate, each element positioned along said plate for electrical connection with the corresponding electrode of a different one of said tubes, and conductive means forming an input line connecting said input terminal to the corresponding electrode of each of said tubes in series, said means comprising pairs of metallic connectors, one pair for each of said contact elements, one connector of each pair connecting the preceding portion of the input line to the remote end of the associated contact element and the other connector connecting the other end of the associated contact element to the succeeding portion of the input line, the connectors of each pair being closely and parallelly positioned on said plate to attain maximum inductive coupling between the connectors.

8. A micro-wave transmission network comprising an insulating plate, a lead-in terminal fixed to said plate for connection to the corresponding electrode of each of a plurality of vacuum tubes in series, metallic contact elements fixed on one side of said plate, one for each tube, metallic strips fixed on said one side of said plate, each strip intermediate a different two of said contact elements, and pairs of U-shaped metallic connectors for interconnecting said lead-in terminal and said contact elements in series, the ends of the connectors of a first pair extending through the plate to connect the lead-in terminal and the near end of the succeeding metallic strip to the remote ends of the associated contact element, the ends of the connectors of each succeeding pair extending through the plate to connect the near ends of the preceding and succeeding metallic strips to the remote ends of the associated contact element, the intermediate portions of the connectors of each pair being closely and parallelly positioned along the other side of said plate opposite the associated one of said contact elements, thereby to attain maximum inductive coupling between the connectors of each pair.

9. In a micro-wave amplifier having a plurality of vacuum tubes, a grid line unit for applying signal potential to the grid element of each tube in series, said unit comprising an insulating plate, an input terminal fixed at one end of said insulating plate, metallic contact plates fixed on one side of said insulating plate, each contact plate positioned linearly for engagement with the grid terminal of a different one of said vacuum tubes, metallic strips fixed on said one side of the insulating plate, each strip intermediate a different two contact plates, and conductive means comprising said metallic strips and pairs of closely parallelled conductors connecting said input terminal to each contact plate in succession, each said pair of conductors being associated with a different one of said contact plates, the conductors of each said pair connecting the near ends of the preceding and succeeding portions of said grid line to the remote ends of the associated contact plate, whereby the current in the closely paralleled conductors of each pair is in the same direction to have maximum mutual inductance and the current in the associated contact plate is in the opposite direction.

10. A micro-wave transmission network for connection to the corresponding electrode of each of a series of vacuum tubes, said network comprising an insulating plate, a line terminal fixed at one end of said insulating plate, metallic contact elements, each said contact element fixed on said plate for engagement with the electrode terminal of a different one of said tubes, and conductive means comprising pairs of connectors connecting said line terminal to each of said contact elements in succession, one connector of each pair connecting said terminal to the remote terminal of the associated one of said contact elements and the other of the pair connecting the other terminal of the associated contact element to the next contact element in succession, the connectors of each pair having closely and parallelly positioned portions to attain maximum inductive coupling therebetween, the currents therethrough being in the same direction and opposite to the direction of the current in the associated contact element.

References Cited in the file of this patent

UNITED STATES PATENTS

| | | |
|---|---|---|
| 2,513,392 | Aust | July 4, 1950 |
| 2,551,228 | Achenback | May 1, 1951 |
| 2,627,579 | Wasmansdorff | Feb. 3, 1953 |
| 2,695,351 | Beck | Nov. 23, 1954 |
| 2,700,150 | Wales | Jan. 18, 1955 |